March 18, 1947. S. S. KISTLER ET AL 2,417,419
ABRASIVE
Filed Aug. 12, 1942 4 Sheets-Sheet 1

Inventors
SAMUEL S. KISTLER
LORING COES, JR.
By William T. Kniesner
Attorney

March 18, 1947.   S. S. KISTLER ET AL   2,417,419
ABRASIVE
Filed Aug. 12, 1942   4 Sheets-Sheet 2
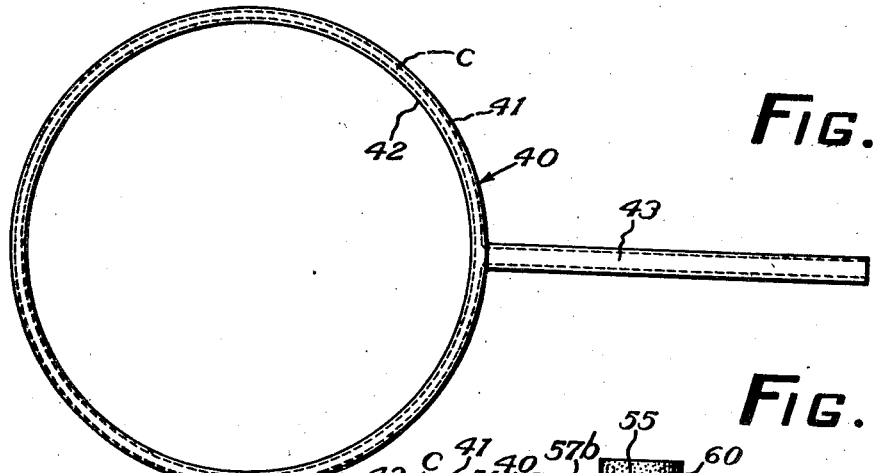
FIG. 8
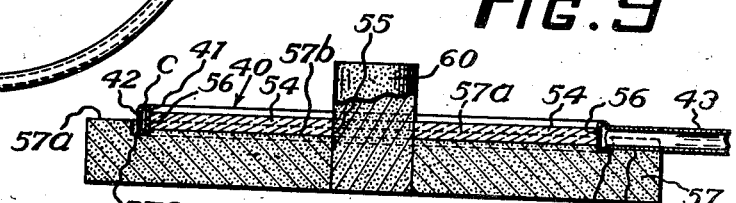
FIG. 9
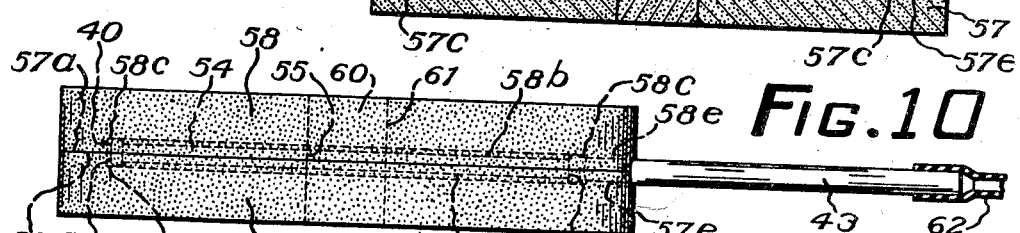
FIG. 10
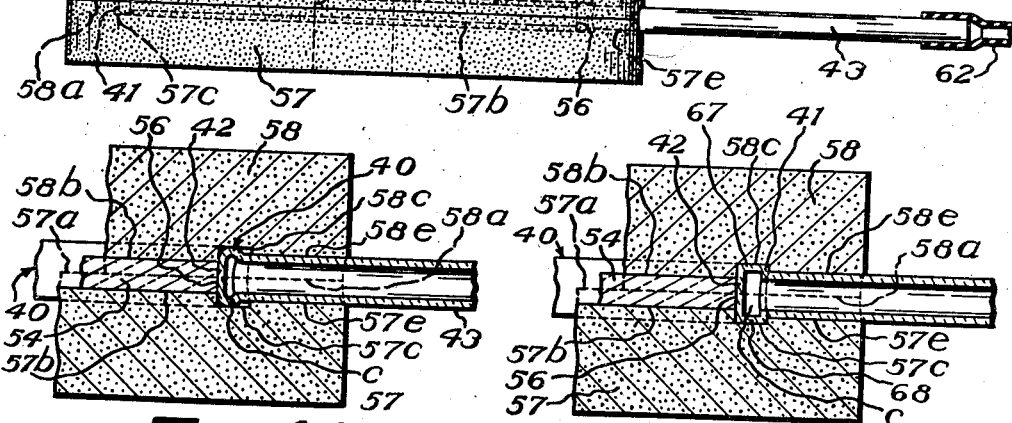
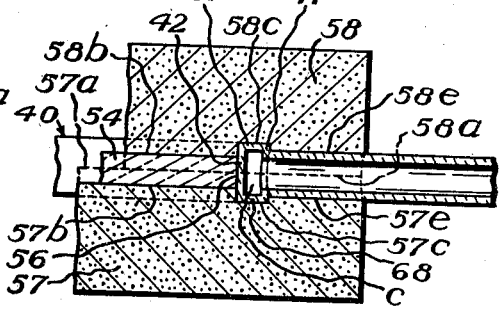
FIG. 11   FIG. 12
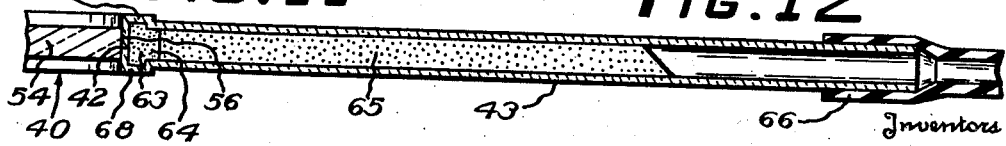
FIG. 13
Inventors
SAMUEL S. KISTLER
LORING COES, JR.
By William T. Kriesner
Attorney

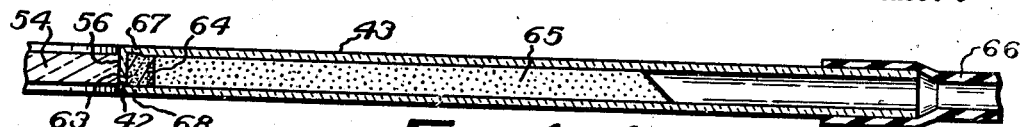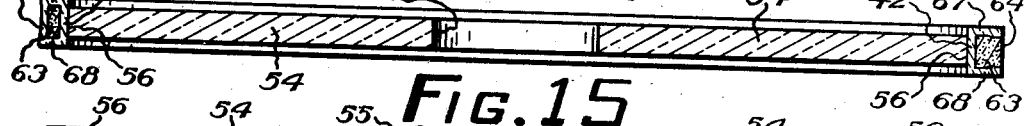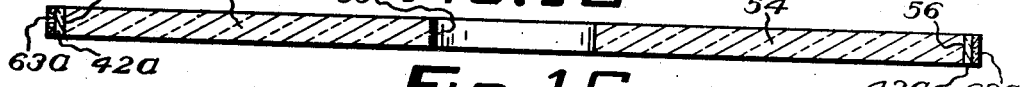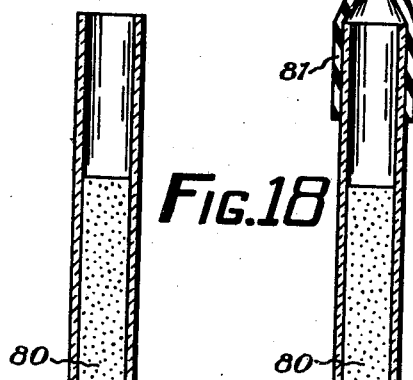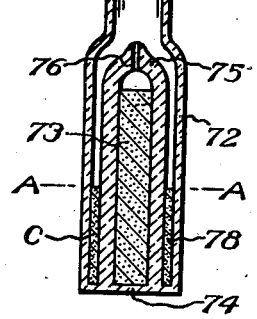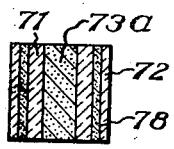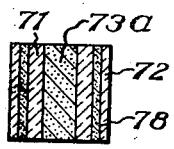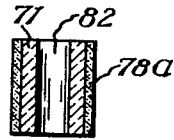

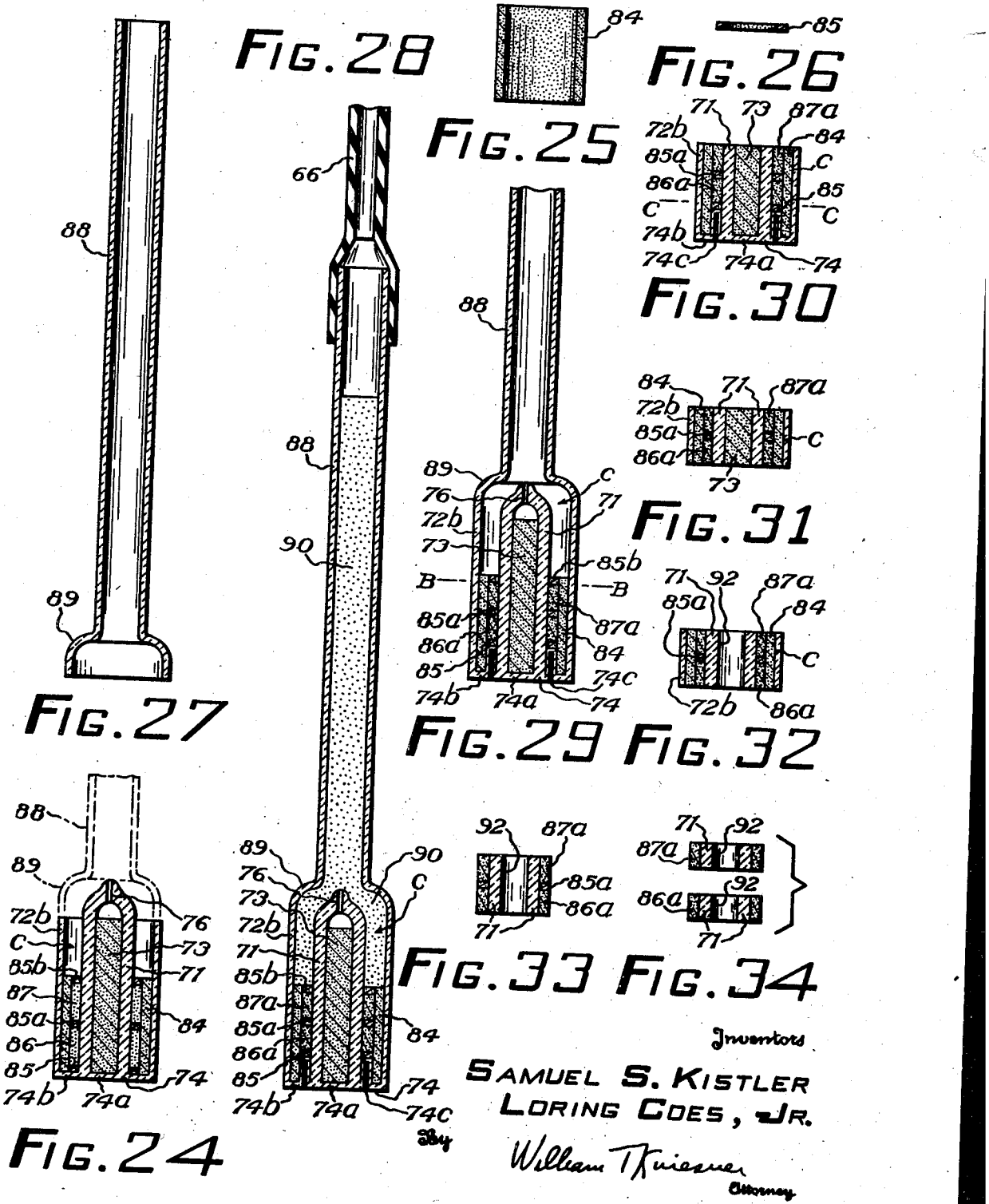

Patented Mar. 18, 1947

2,417,419

UNITED STATES PATENT OFFICE 2,417,419

ABRASIVE

Samuel S. Kistler, West Boylston, and Loring Coes, Jr., Brookfield, Mass., assignors to Norton Company, Worcester, Mass., a corporation of Massachusetts Application August 12, 1942, Serial No. 454,558

19 Claims. (Cl. 51—293)

This invention relates to abrasive articles and to a method for making them, and more particularly to diamond abrasive articles such as wheels and the like.

One of the objects of this invention is to provide a practical and reliable method for making abrasive articles, particularly diamond abrasive wheels, that will be well adapted to meet various and varying requirements met within practice, such as the need for relatively small-diametered wheels as for internal grinding and the need for larger-diametered wheels as for external or other grinding, and still make possible precision of desired distribution of the diamond abrasive grains and make for good efficiency and good economy in the use of such otherwise expensive abrasive materials as diamond particles or grains. Another object is to provide a method of the just mentioned character in which also such varying practical requirements as the width of the operative face of the abrasive wheel may be dependably met, and again with economy and efficiency of use of the diamond abrasive.

Another object is to provide a practical and efficient method for accurately, that is, with minimum waste of diamond grain, bonding the abrasive or diamond grains together and to a support or backing body particularly where the bonding material employed and the material of the support or backing element are the same or of the same characteristics, such as glass. Another object is to provide a dependable method that can be readily, effectively, and efficiently carried out in practice for making a thoroughly practical glass-bonded abrasive article, such as a diamond abrasive wheel, with the support or backing element thereof also of glass, while controlling the distribution of the abrasive particles undergoing bonding amongst themselves and to the support or backing element in a manner to achieve and maintain minimum if any disconformity of the abrasive mass from its intended or desired configuration. Another object is to provide a method of the just stated character in which subsequent finishing or shaping or truing operations may be simplified, thus to make for greater efficiency and economy in production.

Another object is to provide a method of the above mentioned character which may be carried on with relatively simple and inexpensive apparatus. Another object is to provide a method for making abrasive articles of the above mentioned character, utilizing pressure or pressures in one or more of the steps thereof, but capable of being carried out without resort to relatively costly pressure-applying equipment such as hydraulic or other presses and the like the complications and expense of which are multiplied as the range of sizes or dimensions of the abrasive articles to be made increases.

Another object is to provide a simple practical and efficient abrasive article such as a diamond abrasive wheel that will be capable of efficient embodiment in various forms, sizes, and styles or shapes, according to practical requirements to be met, that will make efficient use of such otherwise expensive abrasives as diamond grain, that will be strong and durable and well adapted to meet the varying conditions of hard practical use. Another object is to provide a glass-mounted and glass-bonded diamond abrasive article that is efficient in its utilization of the diamond abrasive and that will be strong, durable and well capable of withstanding temperature differentials between its various portions, such as occur during the practical operation or action of the article in grinding operations.

Another object is in general to provide an improved abrasive article of the above mentioned nature and to provide an improved method of constructing the same. Other objects will be in part obvious or in part pointed out hereinafter.

The invention accordingly consists in the features of construction, combinations of elements, arrangements of parts, and in the several steps and relation and order of each of said steps to one or more of the others thereof, all as will be illustratively described herein, and the scope of the application of which will be indicated in the following claims.

In the accompanying drawings in which several of various possible embodiments of the mechanical features of our invention are shown, Figure 1 is a plan view, partly broken away, showing one possible or preferred way of preliminarily shaping or flattening tubing such, for example, as round glass tubing, that is readily obtainable commercially, as an initial step where abrasive wheels of substantial diameter are to be made;

Figure 8 shows a continuous hollow ring or annular chamber formed from tubing such as is illustrated in Figure 7, and shows the completion of another step, namely, the attachment of a tubular extension or neck opening into the ring or chamber;

Figure 9 shows in central vertical section the bottom member of a holder for coaxially positioning or assembling temporarily a round support or disk with the tubular ring or chamber of Figure 8, the parts being shown prior to the assemblage, to the round support, of the hollow ring;

Figure 10 shows in front elevation the assembled top and bottom members of the complete holder with the disk and ring members positioned and assembled therein, and with the ring chamber neck extension connected to a conduit and ready for the next step or steps;

Figure 11 is a detailed central vertical sectional view on a larger scale of a portion of the assembly shown in Figure 10, indicating the comparative sizes and shapes of the preliminarily preformed or shaped tubular ring chamber and of the rectangularly cross-sectioned annular recess provided therefor in the assembled holder;

Figure 12 is a view similar to that of Figure 11 showing the parts after the flattened tubular ring has been expanded in the holder recess to give it the desired ultimate shape, forming an annular chamber whose interior is substantially rectangular in cross-section;

Figure 13 is a transverse sectional view of the disk and ring assembly along the line or radius of the neck extension, showing them after completion of the step of uniting them in the holder and filled with a mixture of abrasive particles and bonding material and otherwise prepared for the succeeding step;

Figure 14 is a view similar to that of Figure 13 showing, by comparison with Figure 13, certain changes, such as shrinkage in volume of the ring chamber and its contents of abrasive and bond mixture after subsequent treatment thereof;

Figure 15 shows in diametrical cross section the grinding wheel structure resulting from the treatment as in Figure 13 and after the tubular extension of the ring chamber has been removed;

Figure 16 shows in diametrical cross section the finished abrasive wheel resulting from completing certain steps upon the structure of Figure 15;

Figure 17 shows in vertical section a unitary, preformed central support and surrounding annular chamber concentric therewith and opening at the top into an elongated neck or extension, illustrating a possible way of carrying out our invention where smaller-diametered abrasive wheels are to be made, and shows certain initial steps;

Figure 18 is a view similar to that of Figure 17 showing, in comparison with Figure 17, certain changes, such as shrinkage in volume of the annular chamber and its content of abrasive and bond mixture, after subsequent treatment;

Figures 19, 20, 21, 22 and 23 are central vertical sectional views showing the structure in successive stages or steps following that of Figure 18, the finished completed smaller-diametered wheel being shown in Figure 23;

Figure 1:
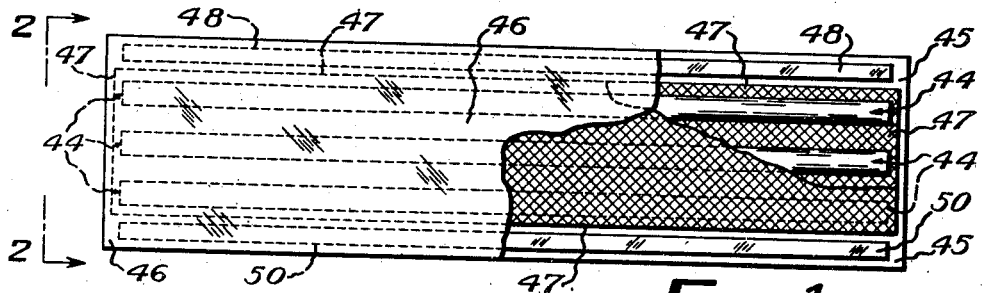

Figure 24 is a vertical sectional view of a structure substantially and broadly similar to a portion of that of Figure 17 showing the structure in somewhat modified form and with certain adjuncts or other elements related thereto for carrying out the broader features of certain of the method steps where it is desired to achieve the production of several abrasive wheels at a time or to facilitate subdivision into several wheels;

Figure 25 is a vertical central sectional view of a sleevelike or cylindrical element forming part of the assembly of Figure 24;

Figure 26 is a central vertical sectional view of one of several parts forming the assembly of Figure 24;

Figure 27 is a vertical central sectional view of a tubular element intended to form a counterpart for performing certain subsequent steps of the assembly of Figure 24;

Figure 28 is a vertical central sectional view of the completed assembly and shows certain parts thereof in their relationships following the performance of certain subsequent steps;

Figure 29 is a view like that of Figure 28 showing the structure after another subsequent step and ready for certain succeeding steps; and Figures 30, 31, 32, 33 and 34 show the structure in vertical sectional view and corresponding respectively to the completion of successive steps performed thereon.

Similar reference characters refer to similar parts throughout the several views of the drawings.

As conducive to a clearer understanding of certain features of this invention it might at this point be noted that, in the making of diamond abrasive articles, such as grinding wheels, it is desirable to achieve nicety or precision of distribution of the diamond abrasive at or throughout the operative portions of the article and throughout the desired depth, yet practical needs require a substantial variety or range of diameters and sizes of wheels such as, for example, small diametered wheels as for internal grinding and larger diametered wheels as for external or other grinding operations; the former may have diameters as small as on the order of 1″ or less and the latter may have diameters material greater, illustratively on the order of 7″ or 8″. Widths of grinding faces also vary according to requirements. One of the dominant aims of this invention is to provide a diamond abrasive article, particularly a wheel, and a method of making the same by which such desirabilities and such requirements as those just noted can be fulfilled or realized by the use of comparatively simple and inexpensive apparatus even though precision of the above-mentioned character and wide variety of diameters or sizes of wheels have to be provided for.

For convenience, we shall first consider an illustrative sequence of steps and illustrative apparatus which we preferably employ in the making of a wheel of relatively large diameter, and accordingly, turning first to Figure 8 of the drawings we make up an annulus 40 of a suitable material such as glass and of a diameter on the order of the outside diameter of the ultimate or finished wheel; this annulus 40 has an inside chamber C bounded by an outer wall 41 and an inner wall 42 which present adjacent concentric cylindrical faces spaced apart by a distance on the order of the thickness which the operative or abrading portion of the wheel is to have and preferably the thicknesses of the walls 41 and 42 are uniform throughout so that their outside faces, like the inside or adjacent spaced faces are parallel and concentric. At a suitable point and extending radially outwardly from the annulus 40 there is connected to it a tubular extension or neck 43.

Figures 5, 7:
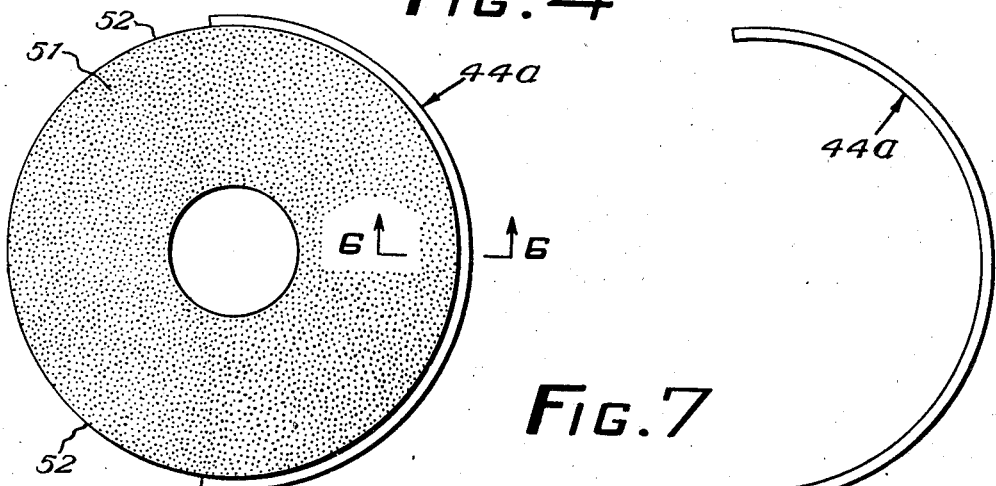
Figure 5 is a plan view showing a possible manner of preliminarily giving the flattened tube of Figure 4 a curvature of the desired radius or approximately so.
Figure 7 is a plan view of the curved flattened tube resulting from the steps shown in Figures 5 and 6.
Figure 6:
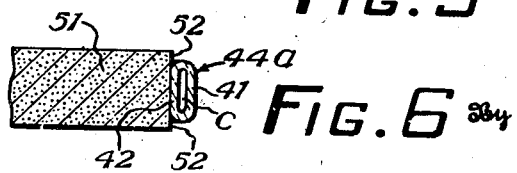
Figure 6 is an enlarged cross sectional view taken on the line 6—6 of Figure 5.

The annulus 40 is preferably tubular in cross-section as appears better from Figure 6 and its circumference is as above indicated on the order of that of the ultimate wheel which may for present purposes be assumed to have a diameter on the order of 7". A preferred way of making up the annulus 40 with its internal chamber C is to follow the steps and use apparatus shown in Figures 1 to 7 to which reference may now be made. Thus we prefer to start with glass tubing of round cross-section and where its length is less than the circumference desired in the ultimate wheel, we start with several lengths of glass tubing, indicated at 44 in Figures 1 and 2, place them in parallel relation between two vertically spaced metal plates or billets 45 and 46, preferably with sheets of asbestos 47 interposed between the tubes and the faces of the plates, and this assemblage is then placed in a furnace and heated to a temperature sufficient to soften the tubing used to an extent sufficient to permit pressing of the tubing in a flattening-out direction and thereby give it opposed parallel flat walls.

Suitable means are employed to control the extent of this flattening-out or pressing operation for its extent may be varied according to circumstances, such as the size of tubing employed, the thickness or radial dimension of the chamber C above mentioned, and the like, and a convenient means comprises stop elements for limiting the approach of the plates 45 and 46, such as parallel-faced bars or shims 48 and 50 of the desired thickness and operating to insure that the contiguous faces of the pressure elements 45 and 46 are parallel in their final position of approach. In Figure 3 the apparatus is shown with the parts in their final position and with the round tubing 44 of Figures 1 and 2 converted to the desired cross-sectional shape with opposed parallel walls, the tubing so converted being indicated in Figure 3 by the reference character 44ᵃ and one of them being shown in Figure 4 in side elevation to show by comparison with Figure 1 the reduced dimension achieved by the lapping operation, Figures 1 and 4 being drawn on the same scale.

Figure 4:
Figure 4 is a longitudinal side view on a smaller scale of a length of flattened tubing.

The now conformed tubing is next given the desired radius of curvature where it is to take part in the making of a wheel and with the tubing at appropriate temperature to facilitate bending it, as by having it heated to redness, it is bent flatwise around a suitable core of any suitable material and of appropriate radius of curvature, and in Figure 5 we have shown a core 51 which conveniently is of any suitable refractory material and preferably is in the form of a disk or annulus of vitrified abrasive, such as a grinding wheel in which the abrasive grains, such as "Alundum" are bonded with a vitreous bond, with the periphery presenting a true cylindrical face 52 of appropriate radius of curvature. In Figure 5 a section of preformed tube 44ᵃ is shown related to such a core, thus showing graphically how the straight tube 44ᵃ of Figure 4 is thus further conformed to the desired radius of curvature, and in Figure 6 is shown in larger scale how the inner wall of the tube 44ᵃ becomes neatly laid against the face 52 of the core 51, that inner wall being there designated by the reference character 42 since it becomes part of the above-mentioned inner wall 42 of the annulus 40 of Figure 8, and its companion wall 41 becomes in general disposed, as a result of this bending operation, as is indicated in Figure 6.

In Figure 7 is shown the flattened tube 44ᵃ as it appears following the step of bending and cooling.

As many lengths, or portion or portions, of tubing as are needed to make up a complete circumference or the annulus 40 of Figure 8 are joined together end to end, using the glass worker's technique, and at any suitable point in the wall 41, referring now to Figure 8, there is joined, again by the glass worker's technique, the above-mentioned neck or tube extension 43, with its interior in communication with the chamber C of the annulus 40 as shown.

Next we provide a support or backing element of the same material as the glass of the tubular annulus 40, and in Figure 9 the support or backing element, indicated by the reference character 54 is shown in the form of a disk of glass having a central round hole 55 of the desired diameter and having a peripheral face 56 that is shaped in any suitable way, as by grinding, to be a cylinder of revolution, coaxial with the hole 55; in thickness the support 54 is less than the width of the annulus 40 of flattened tubing and preferably these parts are so proportioned that the greater of the two cross-sectional dimensions of the chamber C of the annulus 40 and the width of the face 56 of the support 54 are approximately the same, with the former preferably somewhat larger than the latter.

Also the proportioning of these parts is preferably such that the annulus 40 is readily fitted over or onto the periphery 56 of the disk-like support 54, thus to facilitate tentative assembly of one to the other.

Such preliminary assembly is preferably effected with the parts cold, and in making up the latter due regard is had for temperature coefficients of expansion or contraction. For example, where the diameter of the peripheral face 56 of the disk support 54 is 7" when cold, and since the bending of the tube element or elements to make up the annulus 40 takes place at higher temperatures, the radius of bending is greater than the radius of curvature of the disk face 56 and hence, in the assumed illustration, the diameter of the peripheral face 52 of the core 51 of Figure 5 about which the hot tube element is bent is greater than 7", for example 7 $\tfrac{1}{16}$", so that when cold the radius of curvature of the bent tubing will be substantially equal to the radius of curvature of the disk face 56 of Figure 9.

Figures 2, 3:
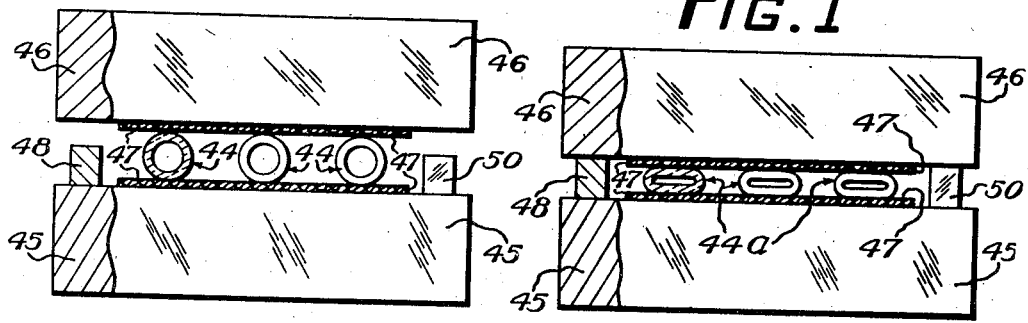
Figure 2 is an end view, partly in cross section and on a larger scale, of the assembly shown in Figure 1 before the flattening or shaping operation.
Figure 3 is a view similar to Figure 2 showing the assembly after the flattening or shaping operation.

By way of further illustration, where the diameter of the disk support 55 is 7", it may have a thickness of ¼" and in such case the tubes 44 initially used, as shown in Figures 1 and 2, can be glass tubing of approximately ⅜" outside diameter and ¼" inside diameter, leaving a wall thickness of $\tfrac{1}{16}$", the comparative views of Figures 2 and 3 showing approximately to scale the cross-sectional dimensions to which the round tubing is conformed while heated and under pressure, as earlier above described.

The disk support 54 is then laid upon the lower element 57 (Figure 9) of a separable or two-part mold 57—58 (Figure 10) made of any suitable material such as graphite. Mold part 57 has a central upstanding pin or stud 60, also of graphite, by which the disk support 54 is centered with respect to other elements of the mold and which also centers the companion mold part 58 which has a central hole 61 into which the centering stud 60 is received upon assembly.

The two mold parts 57—58, which may be circular, are turned or shaped in any other suitable way to provide, in their contiguous faces 57a and 58a complementary mold recesses for receiving respectively, when the two mold parts are assembled, the supporting disk 54, and the annulus 40 with its tube-like extension 43.

Thus mold part 57 has an annular mold recess 57b extending about the stud 60 to receive the disk support 54 to a depth of half its thickness, and peripherally joining the mold recess 57b is a recess 57c into which is receivable the annulus 40 to a depth of half its thickness, a half cylindrical recess 57e extending from the mold recess 57c to the periphery of the mold part 57 to accommodate the neck or tube extension 43 also to about half of its thickness.

In this preliminary assembly of the parts 40 and 54, the disk support 54 becomes accurately positioned in the mold part 57 and the annulus 40 need not be too snugly or with too great precision fitted about the cylindrical face 56 of the disk 54 or into the mold recess 57c, and there can be some degree of latitude of relative dimensions, particularly to facilitate the just-described assembly of these parts to the mold. Also it will be noted that in cross-section, as is better shown in Figure 6, the glass tubing of which the annulus 40 is made, while having two substantially parallel walls has internal and external surface curvatures while the mold recess 57c (Figure 9) is preferably neatly squared off and may have a radial dimension greater than the radial thickness of the annulus 40.

The companion mold part 58 has similar mold recesses as is indicated in Figure 10; thus it has a mold recess 58b that is a counterpart to the above-described mold recess 57b, and about it extends an annular recess 58c companion to the recess 57c, and from the latter extends outwardly a half cylindrical recess 58e companion to the recess 57e. The companion mold part 58 is now slipped onto the centering stud 60 which insures mating of the companion mold recesses, and with the mold faces 57a—58a brought together as shown in Figure 10, the disk support 54 and tubular annulus 40 with neck extension 43 are encompassed within the now assembled mold, with a substantial length of the neck extension 43 projecting radially from the assembled mold.

This assemblage is now placed in a furnace and heated sufficiently to soften the glass of the parts 54 and 40 and, by connecting the neck extension 43, as by a conduit 62, to a suitable source of fluid pressure such as air, the internal walls of the chamber C of the annulus 40 are subjected to uniform pressure throughout, bringing about certain actions.

Thus, the annulus 40 and the chamber C, when first assembled within the mold may have cross-sectional dimensions, as already above indicated, somewhat as shown in Figure 11, but upon the application of heat accompanied by the above-mentioned internal pressure, wall 42 of the annulus 40 is pressed radially inwardly against the cylindrical wall formed by the inner cylindrical faces of the companion recesses 57c and 58c and by the cylindrical face 56 of the disk support 54, and it is made to conform itself thereto and also to become joined, uniformly throughout, to the support 54, the glass of the two parts fusing together, the companion mold recesses 57b and 58b holding the glass of the support 54 against flow or displacement.

Also the outer wall 41 of the annulus 40 is pressed outwardly against the outer mating cylindrical faces of the companion mold recesses 57c and 58c and becomes accurately conformed thereto, while what may be termed the upper and lower walls, in cross-section, of the annulus 40 are uniformly pressed against and conformed to the annular bottom faces of the mold recesses 57c and 58c, as is better shown in Figure 12.

Internally, the cross-sectional shape of the chamber C is thereby made substantially uniformly the same throughout the annulus 40, having therefore a uniform thickness in a radial direction and with the thicknesses of walls 41 and 42 uniform throughout, the chamber C has a substantial nicety of concentricity with the centering stud 60 of the mold and is substantially coaxial with the axis of hole 55 (Figure 9) the maintenance of which the centering stud 60 insures even though the glass is heated to effect the above-described actions.

With illustrative dimensions like those above set forth, the temperature of heating may be on the order of 800° C., comparable to that employed in the flattening and bending operations of Figures 1–5, and the air pressure, illustratively, can be between 0.1 and 0.2 pound per square inch.

After cooling, the mold parts may be separated and the now unitary and substantially integral structure 54—40, with the neck extension 43 projecting radially therefrom, all of glass, may be removed, or if desired removal need not be effected at this stage, and by way of the neck extension 43, the annular chamber C is now filled with the abrasive grain and the bond, the latter being preferably of the same material as is employed in making up the parts 40 and 54 of Figures 8 and 9, and the abrasive grains being preferably diamond particles. Preferably and illustratively, we employ glass known by the trade-mark "Pyrex," such as #776 "Pyrex" glass, both for the disk support 54 and the annulus 40 and for the bonding material for the abrasive particles. In the latter case, it is preferable to reduce the bonding material to be employed, such as the above-mentioned "Pyrex" glass, to substantially the same particle size as the size of the diamond grit or abrasive particles employed, in order that, after thoroughly mixing the diamond particles and the glass particles (illustratively in the proportion of 25% by volume of diamonds and 75% by volume of glass), there is less likelihood of disturbing, as the mixture is flowed into the chamber C through the neck extension 43, the uniformity of their admixture.

Preferably also, in the preparation of the mixture, we wash both the diamond particles and the glass particles in hydrochloric acid to remove any traces of iron or other foreign matter which might cause devitrification of the glass during subsequent heat treatment later described.

Such a mixture, in dry form, is poured into the chamber C through the tube extension 43, suitable means such as tapping or vibrating being preferably employed to insure that the chamber C is substantially uniformly filled throughout its extent, and preferably also some of the mixture is allowed to extend to some extent into the inner end of the neck extension 43, and in Figure 12 the mixture is shown at 63 filling the chamber C and at 64 extending to some extent into the neck extension 43. A substantial extent of the neck extension 43 is now filled, as indicated at 65, with a suitable granular material, such as "Alundum," of say 90 grit, that is impervious to the firing temperature later to be employed.

To the neck extension 43, as by way of a conduit 66, connection is now made to a low pressure or vacuum pump, and the assemblage is heated, in a suitable furnace, and preferably with the now unitary glass structure 54—40 still in the mold 57—58 or reassembled to the mold, and the structure is suitably heated to a suitable firing temperature, all while the pump is creating a below-atmospheric pressure in the chamber C, the porous column 65 (Figure 13) of the granular material, while permitting the passage therethrough of air being exhausted by the pump, serving as a stopper to prevent shifting or other displacement of the mixture of diamond particles and bond, as at 63 and 64, and thus insuring that the mixture in the annular chamber C remains uniformly distributed therein and remains uniformly conformed to the concentrically disposed interior walls of the chamber.

Illustratively, where "Pyrex" glass as above assumed is employed, we prefer to heat the assemblage slowly to about 600° C., while the low pressure is being created within the chamber C, then shift it to another furnace which is operating at, say 800° C., where we leave it for about fifteen minutes, still connected to the vacuum pump, then place it in the 600° furnace and allow it to cool slowly to room temperature. During the firing, the particles of the bonding material fuse together or coalesce, enveloping the diamond particles, and there is also a fusion of the bonding material with the material of the walls of the chamber C in which the mass is confined, and these actions take place under the action of the pressure differential existing between the outside of the chamber C and the interior thereof, that pressure differential approximating or being on the order of atmospheric pressure. The pressure is exerted radially inwardly upon the outer wall 41 of the chamber, uniformly about or throughout its entire peripheral extent, thus compacting somewhat the ringlike or annular mass of diamond particles and bonding material in a radial direction, and against the inner wall 42 which was joined or made integral with the peripheral portion of the disk support 54 in an earlier step, resulting in some reduction in outside diameter. This pressure effect is also exerted in an axial direction and uniformly throughout what may be termed the upper and lower walls, indicated at 67 and 68 in Figure 13, of the chamber C, compacting the mass of abrasive particles and the bonding material in an axial direction and practically reducing the axial dimension thereof from that shown in Figure 13 (being the vertical dimension of the chamber C as seen in Figure 12 and being somewhat greater than the thickness of the disk support 54) to about the dimension shown at the left in Figure 15 and hence to just about the thickness of the disk support 54. Substantial concentricity of the annulus of abrasive particles and substantial maintenance of initial roundness of the annulus are maintained since the pressure exerted radially inwardly is backed up by the mass of the disk support 54 which does not partake of flow or material distortion, particularly if the fusing or burning operation is carried on with the assemblage in the mold 57—58 above described. And thus we are able to avoid material non-uniformity of distribution of the abrasive mass, material variations in its radial thickness, or material departures from concentricity of its inner and outer bounding planes with respect to each other and with respect to the axis of the disk support portion 54.

After cooling off, the granular mass 65 is removed from the tube extension 43 and the latter is cut off in any suitable way along the plane of curvature of the outer wall 41, the latter now being, as will be clear, fused or coalesced with the other glass portions including the bond, the structure appearing substantially as shown in Figure 15.

Next the glass that corresponds to the outer wall 41 and the top and bottom walls 67 and 68 is ground off, as is also the stub-like projection 64 (Figure 15) of the bonded diamond particles that correspond to those that were allowed to extend into the neck extensions 43 as was described in connection with Figure 13, leaving an abrasive wheel as shown in Figure 16, trued and balanced, with an abrasive zone or portion, indicated by the reference character 63ª that is exposed peripherally and also laterally, being, in this illustrative embodiment, of the same width as the thickness of the disk portion 54, with what was initially the inner wall portion 42 of the earlier above-described annulus 40 of Figure 8, indicated in Figure 16 by the reference character 42ª coalesced or fused with both the disk portion 54 and the bonded abrasive portion 63ª.

The wheel is free cutting, hard, long lasting and is durable, having a high efficiency number, namely, the ratio of material removed to wheel wear, and it also has a good quality B, that is, the ratio of the square of the material removed to wheel wear. Though we have in the above specific illustration mentioned "Pyrex" glass other suitable glass may be employed, such as glasses having suitable strength and having preferably a relatively low temperature coefficient of expansion.

For making small-diametered grinding wheels such as are employed for internal grinding, we again utilize an annular chamber and atmospheric pressure, following the principles of our invention as will now be clear in view of all of the foregoing, but we are enabled materially to facilitate construction of such small-diametered wheels by greatly simplifying the initial construction of the part or parts forming the above-mentioned annular chamber C, and reference may first be made to Figure 17. In Figure 17, to achieve this annular chamber C, we utilize two cylindrical or tubular glass parts or sections 71 and 72 of such different diameters that one is freely receivable within the other to form therebetween the desired annular chamber, selecting the outer tube element 72 so that its internal diameter approximates the external diameter of the ultimate grinding wheel and, for purposes of illustration, that diameter may be on the order of 1" or so.

Into the inner tube element 71 we preferably insert a suitable rigid material or a cylindrical member 73 of any suitable rigid material such as graphite and close off the two concentrically arranged tube elements 71 and 72 at one end thereof, as by the glass bottom wall 74, inner tube element 71 being closed off at its other end, as at 75, excepting for a small vent 76, while outer tube element 72 extends about and beyond this closed end of the inner tube element 71, preferably or conveniently at a smaller diameter to form a neck-like extension 77 analogous to the extension 43 above described in connection with Figure 8.

The tube or neck extension 77 is thus in communication with the annular chamber C, and in this embodiment such communication is throughout the entire circumferential extent, and at that end of the chamber C opposite the end or bottom closing wall 74 thereof.

By way of the tube extension 77, an abrasive mixture like that above described is poured into the chamber C to the desired axial distance or height as viewed in Figure 17, and the mixture of diamond abrasive particles and glass bond particles is indicated at 78. This mixture is held in place by granular particles 80 of a suitable refractory material such as "Alundum" of appropriate grit size such as 90, to function like the material 65 described above in connection with Figures 13–14.

By way of a suitable conduit 81, tube extension 77 is connected to the low pressure or vacuum pump and with the latter reducing the pressure within the chamber C, the lower portion of the structure is submitted to heat treatment preferably in sequences of temperatures as was above described, to fuse or coalesce the glass particles of the bond in the mixture 78 with each other and with the glass of the inner tube element 71 and with the glass of the outer tube element 72, the pressure differential, approximating or being on the order of atmospheric pressure, acting uniformly throughout and about the external surface of the tube element 72 where it forms the outer wall of the annular chamber C, thus compacting the abrasive annular mass somewhat and through the latter compacting also the inner tube element 71 against the cylindrical core insert 73, bringing about also relative nicety of concentricity of the several parts and portions and uniformity of distribution of the abrasive portion, as will now be clear.

In these stages, the structure appears somewhat as shown in Figure 18 from which some diminution in outside diameter of the outer tube element 72 appears, it being noted that the mass 80 of particles also becomes somewhat compacted but holds the portions of the outer tube element 72 that overlie them against becoming joined with the inner tube element 71 and thus also preventing the exhausting or pumping action of the pump from being cut off from the chamber C.

The vent 76 in the inner tube element 71 permits the pump to create a low pressure also within the inner tube element 71 and thus insures that the above-described effect of the atmospheric pressure can press or compact the heated inner tube element 71 against the inserted core element 73, the latter being conveniently of graphite as above noted and being preferably accurately machined or formed to the desired and preferably cylindrical shape.

After cooling, the granular material 80 is removed, the structure then appearing as shown in Figure 19, whence by any suitable means, the latter is cut off as along the plane indicated by the line A—A, that being substantially the plane of the upper end of the now compressed and bonded annulus of abrasive particles 78, leaving a structure like that shown in Figure 20. Then the excess glass is ground off as by first grinding off what was the bottom or end wall 74, the structure now appearing as shown in Figure 21, with both ends of the portion 73ª of the graphite insert exposed whence a suitable hole is drilled through this core or the core is completely removed as appears in Figure 22.

With the desired hole now through the structure, as in Figure 22, the wheel may be mounted in any suitable way and the excess peripheral glass, indicated at 72ª, ground off, thus leaving a completed, balanced and true grinding wheel as shown in Figure 23. In the latter figure the abrasive portion is indicated by the reference character 78ª and the backing or support, being a portion of what was the inner tube element 71 of Figures 17 and 18, is indicated by the reference character 71, being comparable respectively to the abrasive portion 63ª and the backing or support 54 of the wheel shown in Figure 15; the latter wheel, with its hole 55 at its center may thereby be mounted in any suitable way as on an arbor or shaft and the wheel of Figure 23, with its central hole 82 may be similarly mounted, for driving to perform an abrading operation. In both forms it will be seen that there is substantial accuracy of distribution of the diamond abrasive and that in the process of making up the wheels there is not only substantial precision of control throughout of the disposition of the diamond abrasive particles but also a minimum if any wastage thereof.

The steps above described in connection with Figures 17 to 23 are particularly well adapted for producing a relatively small diametered wheel with an operative face of substantial axial dimension and lend themselves, according to our invention, to ready production simultaneously of a number of wheels, particularly wheels of lesser axial dimension, all as is about to be described in connection with Figures 24 to 34 to which reference may now be made.

Turning first to Figure 24, we again start with or make up a structure like that above described in connection with Figure 17, but preferably leave off the neck extension 77, and hence, in Figure 24, we make up a glass structure having again the inner tube element 71, vented at the top as at 76, and an outer tube element 72ᵇ which terminates preferably just below the upper end of the inner tube element 71, both being closed off and held concentrically, as was the case in Figure 17 by a bottom element 74 which thus has a central portion 74ª that closes off the inner tube element 71 and an annular portion 74ᵇ which closes off the annular space or chamber C between the tubular elements 71 and 72ᵇ. A graphite core 73 is again snugly contained within the inner tube element 71.

The upper end of this structure thus leaves the chamber C open at its upper end and through that open end we then proceed to build up, within the chamber C certain additional elements for the making up of several wheels and certain coacting adjuncts, preferably as follows:

Thus we make up a hollow cylinder 84 (Figure 25) of a suitable material that will give the cylinder appropriate rigidity as is later described and of a material that preferably does not react with the bonding material or the material of the tube elements, when subjected to the subsequent heat treating steps; a suitable material for this purpose is graphite.

The cylinder 84 has an outside diameter to be snugly received within the outer tube element 72ᵇ and has an inside diameter larger than the outside diameter of the inner tube element 71 by an amount that is equivalent to the thickness which the abrasive portion of the ultimate wheel is to have; in axial dimension the hollow cylinder 84 may be as desired, according to the axial length which it is desired to give the abrasive portion where only one wheel is to be made in this manner or according to the sum of the axial lengths of the abrasive portions of all of the wheels which it is desired to make in one operation, making due allowance for certain actions that subsequently take place and as is later described.

In Figure 24, the hollow cylinder 84 is shown inserted into the chamber C, leaving between it and the inner tube element 71 a substantial portion of the chamber C and into this remaining portion of the chamber C, we first inject, as by sliding it down over the inner tube element 71, a ring element or annulus 85, shown also in Figure 26, and made of a material similar to the material of the hollow cylinder 84, such as graphite. Hollow cylinder 84 and the ring 85 rest against the annular portion 74b of the bottom 74 of the glass structure.

A mixture of diamond abrasive particles and glass bond particles, like that above described, is now poured into the annular chamber to the desired height, illustratively about half the height of the hollow cylinder 84 where, for purposes of illustration, two abrasive wheels are to be simultaneously fabricated, and this mass indicated at 86 will be seen to become accommodated in and conformed to the annular space defined by the coaxial or concentric outer cylindrical surface of the inner tube element 71 and the inner cylindrical surface of the hollow cylinder 84, and with these surfaces truly round or cylindrical and coaxial, the mixture 86 becomes accurately and uniformly distributed and disposed about the common axis of the structure.

Another ring, like the ring 85 and indicated at 85a, is then slipped onto the inner tube element 71 and the two rings mark off in substantially parallel transverse planes the lower and upper boundaries of the mixture 86.

Into the space above the ring 85a there is now poured the mixture, indicated at 87, for the next succeeding wheel, and another ring like the ring 85 and indicated at 85b is put in place, and these steps are carried on for as many wheels as it may be desired to make up.

The graphite rings 85, 85a, 85b, etc., fit into the annular space neatly and relatively snugly but in such a manner as to allow for relative ease of slidable displacement thereof in an axial direction, not only to facilitate assembly as above described but also certain other actions.

Having completed such an assembly, a neck extension, comparable to the element 77 of Figures 17 and 18 is now applied to the structure and this is conveniently and preferably done by way of a glass tube 88, as is shown in Figure 27 suitably flared at its lower end as at 89 to encompass the upper end of the inner tube 71 and to mate with the upper peripheral end of the outer tube element 72b to which it is now joined as by heating with a blow-pipe or otherwise using the glass worker's technique.

Through the neck extension 88 of the now completed structure, granular particles 90, such as the particles 80 of Figure 17 or the particles 65 of Figure 13, are poured into the structure, the column of particles resting against the upper end faces of the hollow cylinder 84 and of the uppermost ring 85b, it being noted that these faces may or may not be in the same plane, though assumed to be so in Figures 24 and 28. The mass of particles 80 is compacted sufficiently or is of sufficient mass to serve also as a stop element to hold the annular parts underlying the lower annular end of the column of particles 90 in the chamber C against upward movement as viewed in Figure 28, and to the tube extension 88, as by the conduit 66, connection is made to the low pressure or vacuum pump, as was earlier above described, and with the pump reducing the pressure within the chamber C, the lower portion of the structure as seen in Figure 28 is now submitted to heat treatment preferably in sequences of temperatures as was earlier above described.

During the heat treatment the glass portions soften up, including the glass of the bottom part 74 but there exists a pressure differential between the two sides or faces of the bottom part 74, the pressure being atmospheric on the external side and below atmospheric pressure on the internal side. The circular portion 74a of the bottom part 74 is, however, internally buttressed by the graphite core 73 and is thus mechanically supported against material distortion under the above-mentioned pressure differential. An outer part of the annular portion 74b of the bottom part is in a similar manner buttressed or supported by the lower end face, as seen in Figure 28, of the cylindrical element 84 and an inner annular part of the annular portion 74b is supported against the bottom ring element 85, the latter and such other rings, such as ring 85a, that are employed and excepting the uppermost ring 85b being, as is above noted, so fitted that they may partake of sliding movement in an axial direction and hence the above-mentioned pressure differential operates upon that portion of the glass bottom part 74 against which the bottom ring 85 rests to press the latter inwardly in an axial direction (upwardly as seen in Figure 28), thus compacting the one or more mixtures of diamond abrasive particles and glass bonding particles.

During this latter action the uppermost ring 85b is held against material upward movement by the granular mass 90 and it is against that ring 85b that the one or more annularly disposed masses, such as the masses 87 and 86 of abrasive particles and bonding material are pressed, intermediate rings such as the ring 85a partaking of movement, a movement somewhat less than the movement which the lowermost ring 85 undergoes, as is indicated by the comparison of Figure 28 with Figure 24.

This compressing or compacting action, which illustratively may have an extent to achieve a reduction in volume of the abrasive masses on the order of 40%, is accompanied by a distention inwardly into the space between the inner tube element 71 and the rigid hollow cylinder 84 of the glass of an annular portion of the bottom part 74 as is indicated in Figure 28 at 74c, thus thinning out the walls of that annular glass portion as the compacting or compression proceeds, due regard being of course given to insure that there is in the bottom portion, as by its thickness, adequate mass of glass for this follow-up distending action, in relation of course to the desired extent of compacting to be achieved.

While these actions are taking place, the same pressure differential is effected to conform the inner tube element 71 snugly to and about the cylindrical surface of the rigid core 73 which prevents material distortion of the heated inner tube element 71, the axial compression or compacting above described insuring that the mass of abrasive particles and bonding material expands, if necessary, in a radial direction both inwardly against the inner tube element 71 and outwardly against the inner truly cylindrical face of the hollow cylinder 84. Against the outer surface of the latter, this same pressure differential presses the outer tube element 72b, maintaining it intact during the continued pumping operation.

The bonding material, where it comprises the above-mentioned glass particles, fuses during the heat treatment, the bonding particles coalesce one with another and also with the glass of the inner tube element 71, effectively encompassing the diamond abrasive particles in their initial quite precise disposition and arrangement and the fused bonding material effectively unites with the glass of the inner tube element 71.

Such actions may take place somewhat progressively in the sense that the compacting or compressing action takes place progressively in accordance with the rate at which the pressure differential is increased by the pump and the rate at which heating of the glass takes place. The cylindrical element 84, it may be noted, also takes part in maintaining the various parts concentric or coaxial with each other, and in particular guides the movable ring or rings during their movement.

After cooling, the granular mass 90 is removed, leaving a structure like that shown in Figure 29. This structure is cut off along the plane B—B of Figure 29, that being the plane in which graphite ring 85b engages the now solid and bonded abrasive annulus 87a. In effecting such a cutting-off operation it will be seen that only two glass elements have to be cut through, namely, the parts 72b and 71, the graphite parts 85b and 84 being relatively easy to cut away, and it will be noted that no cutting or abrading need be effected upon the upper end face as viewed in Figure 29 of the bonded diamond abrasive annulus 87a.

The structure thus resulting from this cutting operation appears as is shown in Figure 30. That structure in turn is cut off along the plane represented by the line C—C of Figure 30 and it will be noted that the cutting operation has the same facility or ease and advantages as the cutting off operation above described along the plane B—B.

The structure now appears as shown in Figure 31 and is ready to be finished off and segregated into its several individual wheels where as in the illustration more than one wheel is to be made up in this manner, illustratively the two earlier above mentioned.

A preferred sequence of operations may now comprise drilling a hole through what is left of the graphite core 73 or completely removing it, leaving a coaxial bore or hole 92 as shown in Figure 32, whence the structure may be mounted on an arbor or the like and the outer layer of glass corresponding to what is left of the outer tube element 72b (Figure 32) is ground off, as is also what is left of the graphite sleeve or cylinder 84, down to the outer cylindrical faces of the abrasive annulus 86a and 87a, those faces having been neatly and with suitable precision defined by the inner cylindrical face of the graphite cylinder 84 (Figure 28). The resultant structure is like that shown in Figure 33, and where intermediate rings have been employed such as the ring 85a, that structure is now cut transversely of the axis throughout the region of each such intermediate ring, thus subdividing it into the several and now substantially completed abrasive wheels, such as the two shown in Figure 34, each having a backing or support 71 like the support 71 of Figure 23 or the support 54 of Figure 16 with an abrasive bonded annulus bonded thereto, as at 86a and as at 87a in Figure 34 corresponding to the abrasive portion 78a of Figure 23 or 63a of Figure 16.

It will thus be seen that, in producing wheels as above described, according to our method, it is possible to achieve throughout nicety of control of the initial disposition and distribution of the abrasive particles and to maintain such distribution throughout the process, bringing to a minimum wastage as might otherwise be necessary in effecting final or ultimate trueing or balancing and avoiding also wasted distribution of portions of the diamond abrasive particles. Thus, for example, in actual use and with even wheel wear, the wheel or wheels may be made to function down to what is substantially the innermost layer or region of abrasive particles, since the inner imaginary boundary plane, where the wheels are of the peripheral type as set forth illustratively herein, is, for practical purposes, substantially a surface of revolution coaxial with the axis of the ultimate or finished wheel.

Abrasive articles made according to our method have good characteristics as above pointed out, being for example free cutting, long-lasting, durable and are of high efficiency and of good quality B. In appearance, where transparent glass is used, they appear to be of solid glass throughout with the diamond abrasive particles appearing somewhat as though suspended throughout the region of their distribution. And hence, for example in Figure 15, the line of demarcation shown in that figure between the support element 54 and the glass portion 42a is not actually present, these portions having been fused together, while the lines or planes of demarcation, as in Figures 15, 23 and 34 between the abrasive portions and the glass portions are intended principally to indicate the imaginary or actual plane that limits the disposition of the diamond abrasive particles rather than to indicate a physical line or plane of cleavage, for the glass of one part and the glass bond of the abrasive portion are united and appear unitary throughout.

In the various illustrative forms above described, it will be noted that the elements that envelop the chamber C might be collectively referred to as an envelope for containing the mixture of abrasive particles and bond particles, the latter to become fused or coalesced with each other and with the material of the envelope, and that, in the above forms, the envelope is of curved or circular or annular shape, since we believed our invention to be best illustrated by way of grinding wheels, but it is to be understood that such a description and showing are therefore illustrative and not by way of limitation and that the envelope may be given any other shape according to the shape of the abrasive article to be produced or formed, so long as the envelope can be subjected to a fluid pressure differential, preferably by creating a lower pressure inside of it than is exerted outside of it. And in this connection it might also be pointed out that it will be seen to be optional, according to the kind or shape of abrasive article to be produced, to mount or not to mount such an envelope relative to a support or backing member made up of a similar material with which the material of the envelope can coalesce or fuse. Thus in the form of Figures 1 to 16, the envelope is mounted and fused together with the back 54 whereas in the forms of Figures 17 to 34 no such mounting need be resorted to, an element that forms a wall of the envelope serving per se as the support or backing such as a portion of the inner tube element 71 in these figures.

During the heating, it will be noted that the glass of the glass wall or walls and the glass of the bonding particles fuse or coalesce in the region of the initial plane or boundary between the mass of abrasive and the compacting wall or walls; during such action, and depending upon the magnitude of the pressure employed, some of the glass of the wall or walls is available for direct bonding to or with immediately adjacent abrasive particles and there could be present an intermingling, to a greater or lesser extent, of the glass of the bonding particles and the glass of the wall or walls. Where a relatively thin annulus or region of abrasive particles is desired, the envelope has its part or parts suitably proportioned to make the chamber of corresponding thickness and it is within the contemplation of our invention, under circumstances such as these, that the glass bonding particles may be omitted and the glass of a wall or several walls made to flow and intermingle with the abrasive grains and thus bond them; however, we prefer to follow such procedures as earlier and fully above described for they have the additional advantage of making for better precision and control of the disposition of the abrasive grain.

Thus it will be seen that there has been provided in this invention an abrasive wheel and a method for making the same, in which the various objects above set forth together with many thoroughly practical advantages are successfully achieved.

As many possible embodiments may be made of the mechanical features of the above invention and as the art herein described might be varied in various parts, all without departing from the scope of the invention, it is understood that all matter hereinabove set forth, or shown in the accompanying drawings, is to be interpreted as illustrative and not in a limiting sense.

We claim:

1. In a method of making an abrasive article, the steps which comprise confining a mixture of abrasive grains and heat responsive bonding material in an envelope made of a material that is substantially rigid at normal temperature but which becomes pliant when heated, heating the assembly to make said bonding material effective and the material of said envelope pliant, and during heating compressing the mixture by applying pressure to a wall of the envelope.

2. In a method of making an abrasive article, the steps which comprise confining a mixture of abrasive grains and heat responsive bonding material in an envelope made of a material that is substantially rigid at normal temperature but which becomes pliant when heated, heating the assembly to make said bonding material effective and the material of said envelope pliant, and during heating creating a pressure within the envelope below atmospheric to compact the mixture.

3. In a method of making an abrasive article, the steps which comprise placing in a glass envelope a mixture of abrasive grain and glass bonding particles, heating the assembly to fuse the glass particles together, and during heating applying pressure to the glass envelope to compact the mixture therein.

4. In a method of making an abrasive wheel, the steps which comprise confining abrasive grain and glass bonding particles in a glass envelope having an annular chamber for receiving them formed between walls that comprise concentric inner and outer walls and a closing end wall, heating the assembly to fuse the glass bonding particles together, and during heating applying pressure to at least one of said walls of the envelope to compact said mixture and to press the latter and said wall together.

5. In a method of making an abrasive wheel, the steps which comprise confining a mixture of abrasive grain and glass bonding particles in axially spaced sections of an annular chamber formed between walls that comprise concentric inner and outer walls and a closing end wall, the sections of said chamber being formed by ring-like means that is substantially unaffected by the subsequent heat treatment, heating the assembly to fuse the glass bonding particles together, during heating applying pressure externally of said walls to compact the mixture in the several sections in said chamber, and after cooling the assembly cutting it apart through the region or regions of said separating means.

6. In a method of making an abrasive article, the steps which comprise placing abrasive grain in an envelope made of a heat-responsive bonding material, heating the assembly, and during heating compressing the abrasive grain within the envelope to flow material of at least one wall of said envelope into bonding coaction with said abrasive grain, and after cooling removing so much of at least said one wall of the envelope to expose said abrasive grain.

7. In a method of making an abrasive wheel, the steps which comprise heating a tubular annulus made of a heat-responsive bonding material in a mold having an annular mold recess to accommodate said annulus, applying pressure to the interior of said annulus to conform it to said mold recess, filling the annulus with abrasive grain, assembling it to a circular support made of a heat-responsive material with which said annulus material can coact, heating the assembly, and during heating pressing the outer wall of said annulus in a direction toward said support to bond the materials of the annulus and of said support together and to flow material of the annulus into bonding relation to said grain, and after cooling removing enough of an exposed wall of said annulus to expose the bonded abrasive grain.

8. A method as claimed in claim 7 in which the step of applying pressure to a wall of said annulus is carried out by reducing the pressure within the annulus to a value below atmospheric.

9. In a method of making an abrasive wheel, the steps which comprise, placing abrasive grain in a fusible container, heating the assembly to fuse it, and during heating compacting the abrasive grain and the portion of the wall of said fusible container with which the grain is in contact to flow the material of said fusible container into bonding co-action with said abrasive grain.

10. In a method of making an abrasive wheel the steps which comprise confining abrasive grain in a fusible container having concentric inner and outer walls and a closing end wall and with the abrasive grain exposed to at least one of said walls, heating the assembly to fuse the material of the container, and during heating compacting the abrasive grain and the wall or walls to which the abrasive grain is exposed to flow the container material into bonding co-action with said grain.

11. An abrasive article comprising a glass support having around its periphery a glass closure filled with abrasive grain.

12. An abrasive article comprising a glass envelope containing a mixture of abrasive grain and glass bonding material.

13. An abrasive article comprising a glass envelope having opposed co-axial ring-shaped walls substantially uniformly spaced apart and thereby co-acting to define an annular interior space of substantially uniform width, said envelope containing in said space and substantially conformed to its annular shape a mixture of abrasive grain and glass bonding material which is matured to bond the abrasive grain into an annular mass integrally united with at least one wall of said glass envelope.

14. An abrasive article comprising a ring-shaped tube-like glass closure whose walls define an annular interior space of substantially uniform cross-section, said closure being filled with an annulus of glass-bonded abrasive grains conformed to said annular space and integrally united with the glass of said closure, and a round glass support having a ring-shaped peripheral portion that has united therewith a wall of said glass ring-shaped closure.

15. An abrasive article comprising a glass envelope having concentric inner and outer walls of circular cross-section and thereby co-acting to define an annular interior space of substantially uniform cross-section, said space having therein ring-shaped divider means for axially sub-dividing said annular space into a plurality of annular sections, each of said sections containing and having substantially conformed thereto a mixture of abrasive grain and glass bonding material which is matured to bond the abrasive grain into an annular mass integrally united with at least one of said concentric walls of said glass envelope.

16. An abrasive article as claimed in claim 15 in which said divider means comprises a preformed ring-shaped member of a material that is infusible at the fusing temperature of the glass, said member presenting preformed end faces to the annular masses between which it extends.

17. An abrasive article comprising a glass envelope having concentric inner and outer walls of circular cross-section, one of said walls having a relatively rigid sleeve-like liner of a material that is infusible at the fusing temperature of the glass, said member and the other wall of said glass envelope co-acting to define an annular interior space of substantially uniform cross-section, said envelope containing in said space and substantially conformed to its annular shape a mixture of abrasive grain and glass bonding material which is matured to bond the abrasive grain into an annular mass integrally united with said other wall of said glass envelope.

18. An abrasive article comprising a glass envelope having concentric inner and outer walls of circular cross-section and co-acting to form an annular interior chamber, said chamber containing relatively rigid means of a material that is infusible at the temperature of the glass and providing a lining for one of said walls and providing a transverse end wall for the annular space that remains in said chamber, said space containing and having conformed to its annular shape and to the interiorly exposed faces of said rigid means a mixture of abrasive grain and glass bonding material.

19. In a method of making an abrasive article the steps which comprise placing in a closed envelope a mixture of abrasive grain and glass bonding particles, heating the assembly to fuse together the glass particles of said mixture and to fuse the said glass envelope with the said glass particles of said mixture, and during heating applying pressure to the glass envelope to compact the mixture therein and to press together the mixture and at least a portion of said envelope.

LORING COES, Jr.
SAMUEL S. KISTLER.

REFERENCES CITED

The following references are of record in the file of this patent:

UNITED STATES PATENTS

| Number | Name | Date |
|---|---|---|
| 687,962 | Hyde | Dec. 3, 1901 |
| 1,981,970 | Sanford | Nov. 27, 1934 |
| 1,336,751 | Linbarger | Apr. 13, 1920 |
| 2,172,243 | Goodnow et al. | Sept. 5, 1939 |
| 2,281,525 | Milligan et al. | Apr. 28, 1942 |
| 2,189,259 | Van der Pyl | Feb. 6, 1940 |
| 2,145,888 | Moulton et al. | Feb. 7, 1939 |
| 2,268,599 | Kinney et al. | Jan. 6, 1942 |
| 1,996,598 | Taylor | Apr. 2, 1935 |
| 604,569 | Ringstrom | May 24, 1898 |
| 813,086 | Frist | Feb. 20, 1906 |
| 1,728,883 | Simon | Sept. 17, 1929 |